United States Patent
Juneja et al.

(10) Patent No.: US 12,489,307 B2
(45) Date of Patent: Dec. 2, 2025

(54) BATTERY PERFORMANCE MONITORING AND OPTIMIZATION

(71) Applicant: Applied Energy Technologies Private Limited, New Delhi (IN)

(72) Inventors: Ashok Juneja, New Delhi (IN); Shweta Singh, New Delhi (IN)

(73) Assignee: Applied Energy Technologies Private Limited, New Delhi (IN)

( * ) Notice: Subject to any disclaimer, the term of this patent is extended or adjusted under 35 U.S.C. 154(b) by 593 days.

(21) Appl. No.: 18/047,466

(22) Filed: Oct. 18, 2022

(65) Prior Publication Data
US 2024/0079895 A1    Mar. 7, 2024

(30) Foreign Application Priority Data
Sep. 6, 2022    (IN) .............................. 202211050916

(51) Int. Cl.
*H02J 7/00*    (2006.01)
*G06N 20/00*    (2019.01)

(52) U.S. Cl.
CPC ............ *H02J 7/0071* (2020.01); *G06N 20/00* (2019.01); *H02J 7/0048* (2020.01)

(58) Field of Classification Search
USPC ................ 320/131, 132, 133, 134, 135, 136
See application file for complete search history.

(56) References Cited

U.S. PATENT DOCUMENTS

| | | | |
|---|---|---|---|
| 2019/0176639 A1* | 6/2019 | Kumar | B60L 3/0046 |
| 2019/0202414 A1* | 7/2019 | Shih | B60L 53/665 |
| 2024/0094302 A1* | 3/2024 | Chang | H01M 10/4285 |

* cited by examiner

*Primary Examiner* — Brian Ngo
(74) *Attorney, Agent, or Firm* — Dority & Manning, P.A.

(57) ABSTRACT

Examples of systems and methods for monitoring and optimizing battery performance for a site are disclosed. In an example, sensor data pertaining to the site may be obtained. Based on the sensor data and historical data of the site, one or more anomaly events is predicted by a first machine learning model (126). The one or more anomaly events may further be classified into critical event and non-critical event. In case of the critical events, one or more commands may be sent to an edge device (102) installed at the site to perform corrective actions.

10 Claims, 9 Drawing Sheets

BATTERY PERFORMANCE MONITORING AND OPTIMIZATION

CROSS-REFERENCE

The application claims priority to Indian Application No. 202211050916 filed Sep. 6, 2022, which application is incorporated herein by reference in its entirety for all purposes.

FIELD OF INVENTION

The present subject matter relates, in general, to battery performance on a site and, particularly, to monitoring and optimizing battery performance for a site.

BACKGROUND

Nowadays, batteries are used to store energy and provide electricity to a site, such as a telecommunication site, a power grid site, a commercial site, and so on. When power sources, such as carbon-based sources (grid and/or diesel generator) and renewable sources (solar, wind etc.) may not be available, batteries are employed to keep the uptime of the site.

BRIEF DESCRIPTION OF FIGURES

The detailed description is provided with reference to the accompanying figures, wherein.

DETAILED DESCRIPTION

Figure 1:
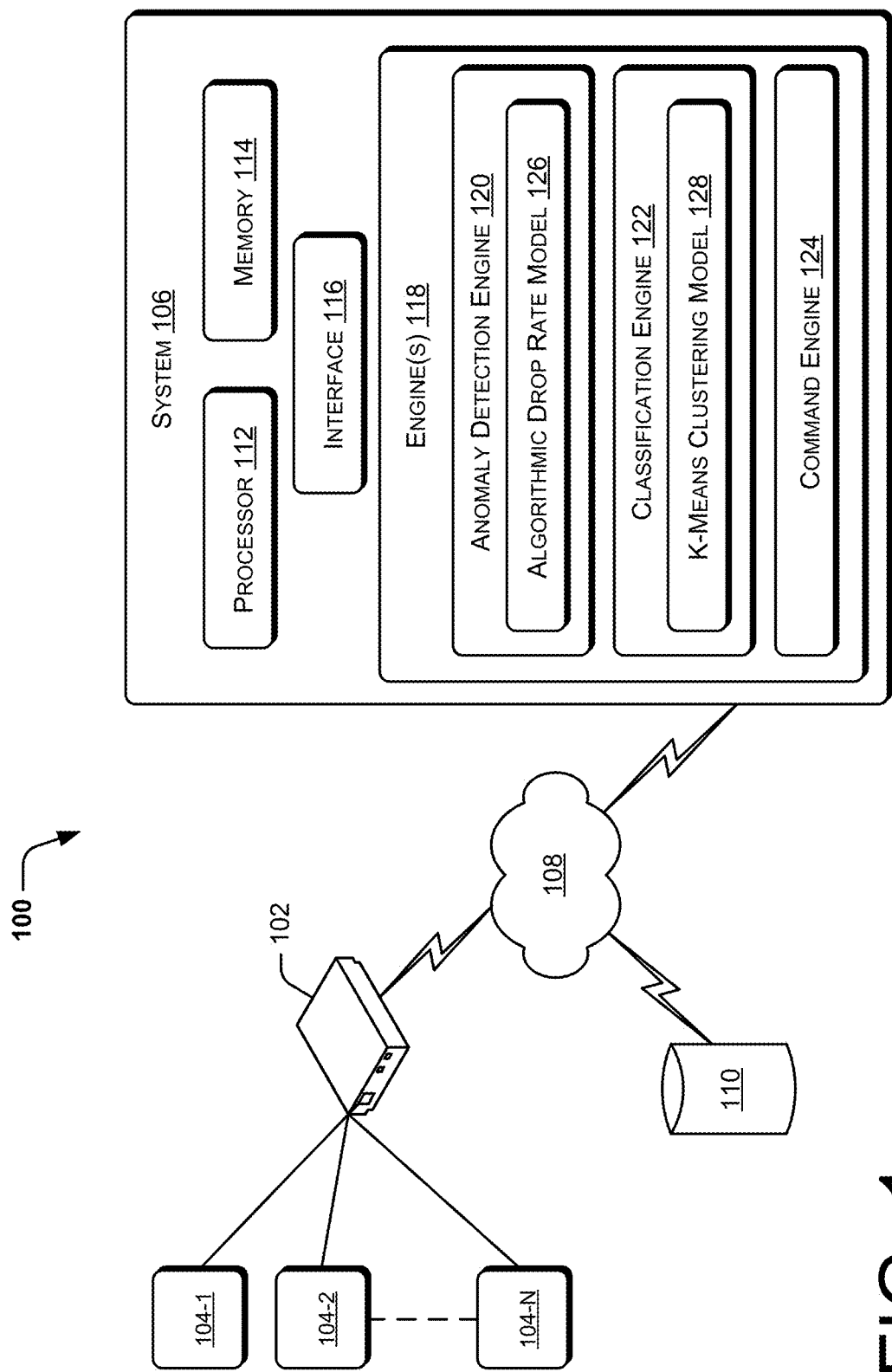
FIG. 1 illustrates a system for monitoring and optimizing battery performance for a site, according to an example.

Nowadays, usage of batteries at sites, such as telecommunication sites (e.g., telecommunication base station, telecommunication tower, etc.), power grid sites (e.g., solar farms, wind farms, hydropower plants, nuclear power plants, and coal-fired plants, etc.), commercial sites (e.g., hospital, banks, schools, etc.), and so on, has become ubiquitous. Batteries are employed at the sites to store energy and provide electricity when other power sources may not be available. Batteries with long life and more amount of time to support the load of a site facilitate in reducing dependence on carbon-based diesel generators, thereby reducing carbon footprint of the site. For example, if batteries are unable to support the load of the site for more amount of time, dependency on carbon-based sources like diesel generators is increased. The term "load" as used herein refers to electric power, measured in KW, required to run a site.

Although, batteries are the lifeline of power backup system on the sites, batteries are not always cost-effective and are sometimes susceptible to failures. Having inefficient or defective batteries may cause many undesired consequences. Moreover, to be able to fully utilize the value of the batteries, it is imperative that the batteries perform efficiently for longer durations.

The present subject matter discloses example approaches for monitoring battery performance and performing timely preventive and/or corrective maintenance and correcting faults in timely manner.

The present subject matter describes methods and systems for monitoring and optimizing battery performance for a site. As per the present subject matter, sensor data related to a plurality of parameters associated with a battery is obtained. For example, the plurality of parameters may include, battery charge voltage, battery discharge voltage, state of charge, and so on. Based at least on the plurality of parameters from the plurality of sensors, anomaly events may be predicted. In an example, the anomaly events may be predicted with the help of a first machine learning model, such as an Algorithmic Drop Rate Model. Details of the machine learning model and/or Algorithmic Drop Rate Model are described herein elsewhere.

In some embodiments, the anomaly events may then be classified as critical and non-critical events. For the critical events, a command may be automatically issued based on which certain actions associated with the battery may be taken. For example, the battery may be charged or discharged in response to the command.

Accordingly, the present subject matter facilitates in analyzing data obtained from the site and detecting based on the analysis when the performance of the battery starts to destabilize. Based on the analysis, corrective actions may be taken on the battery well in advance, thereby improving battery performance and battery life. Improved battery health increases battery life which reduces carbon footprint (for example, by minimizing usage of diesel generators, by maximizing uptime of the sites and thereby reducing wastes associated with potential component replacements, etc.). This provides a cost-effective implementation of the batteries and may prolong a lifetime of the batteries.

The present subject matter is further described with reference to the accompanying figures. Wherever possible, the same reference numerals are used in the figures and the following description to refer to the same or similar parts. It should be noted that the description and figures merely illustrate principles of the present subject matter. It is thus understood that various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

The manner in which the systems and methods are implemented are explained in detail with respect to FIGS. 1-7. While aspects of described systems and methods can be implemented in any number of different electronic devices, environments, and/or implementations, the examples are described in the context of the following system(s). It is to be noted that drawings of the present subject matter shown here are for illustrative purposes and are not drawn to scale.

FIG. 1 illustrates a network environment 100 for monitoring and optimizing battery performance for a site, according to an embodiment. Examples of the site may include, but are not limited to, a telecommunication site and a power grid site. A telecommunication site may include a telecommunication base station, a telecommunication tower, etc. Power grid sites may include solar farms, wind farms, hydropower plants, nuclear power plants, and coal-fired plants, etc. To ensure that the equipment at the site function uninterrupted without any sudden power failure, batteries (not shown) are employed at the site to provide backup. Further, the site may include an edge device 102, such as an Internet of Things (IoT) edge device 102 to collect data from different sensors 104 implemented at the site. In some embodiments, the IoT edge device 102 may comprise a plurality of sensors and is capable of obtaining sensor data via internal sensors. Based on the real time data collected from the different sensors, the edge device 102 may create real time feeds at regular intervals or continuously. Alternatively or additionally, the edge device 102 may create feeds on occurrence of events, such as when sensor data shows anomalous behaviour associated with one or more batteries, power lines, or other components associated with the network environment 100. The edge device 102 is communicatively connected to a plurality of sensors 104-1, 104-2, 104-3 . . . 104-N, collectively referred to as sensors 104 and individually referred to as a sensor 104, through a network 108. Examples of the sensors 104 may include, but are not limited to, a proximity sensor, a pressure sensor, a humidity sensor, and a level sensor. In some embodiments, the sensor 104 may be an electrical characteristics sensor, which can be configured to detects one or more specific parameters, such as voltage, electric current, electrical resistance, electrical reactance, electrical charge, partial discharge, electrical power, magnetic flux, magnetic field, etc. Various types of sensors may be utilized to measure the electrical characteristics of different components of the batteries in the sites, for example, electricity meter, electrometer, Hall effect sensor, etc. In some embodiments, one edge device 102 is connected to one site. In some embodiments, a plurality of edge devices 102 are connected to one site.

Alternatively or additionally, the network environment 100 may include a system 106. In some embodiments, the system 106 is located at a remote location and communicatively coupled to the edge device 102. In some embodiments, the system 106 is located on site along with the network environment 100. As described elsewhere herein of this disclosure, the system 106 may detect disruption in battery performance and predict failure of the battery in a timely manner. The system 106 may be implemented in a variety of computing devices, including, servers, a desktop personal computer, a notebook or portable computer, a workstation, a mainframe computer, a laptop and/or communication device.

The edge device 102 and the system 106 are communicatively coupled over a network 108 through one or more communication links. The communication links between the edge device 102 and the system 106 are enabled through a desired form of communication, for example, via dial-up modem connections, cable links, digital subscriber lines (DSL), wireless, or satellite links, or any other suitable form of communication. In some embodiments, the communication links may be chosen based on suitability to the network environment 100, communication distance ranges, and/or the natural environment surround the site.

In an example implementation, the network 108 may be a wireless network, a wired network, or a combination thereof. The network 108 can also be an individual network or a collection of many such individual networks, interconnected with each other and functioning as a single large network, e.g., the Internet or an intranet. The network 108 can be implemented as one of the different types of networks, such as Intranet, Local Area Network (LAN), Wide Area Network (WAN), the Internet, and such. The network 108 may either be a dedicated network or a shared network, which represents an association of the different types of networks that use a variety of protocols, for example, Hypertext Transfer Protocol (HTTP), Transmission Control Protocol/Internet Protocol (TCP/IP), Message Queuing Telemetry Transport (MQTT) protocol, short message service (SMS), etc., to communicate with each other.

The network environment 100 further comprises a database 110 communicatively coupled to the edge device 102 and the sensors 104 via the network 108. The database 110 may store all data pertaining to the sensors 104. In an example, the database 110 may store historical data as well as time series data collected during usage of the sensor 104. Although the database 110 is shown as a separate entity in the network environment 100, it will be appreciated by a person skilled in the art that the database 110 can also be internal (locally available) to the edge device 102.

The system 106 may include a processor 112 that may be communicatively coupled to the edge device 102. The processor 112 may include microprocessors, microcomputers, microcontrollers, digital signal processors, central processing units, state machines, logic circuitries, and/or any other devices that manipulate signals and data based on computer-readable instructions. Further, functions of the various elements shown in the figures, including any functional blocks labelled as "processor(s)", may be provided through the use of dedicated hardware as well as hardware capable of executing computer-readable instructions.

Further, the system 106 may include a memory 114. The memory 114 may comprise any non-transitory computer-readable medium including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

In an example, the system 106 may include interface(s) 116. The interface(s) 116 may comprise a variety of interfaces, for example, interface(s) 116 for users. The interface(s) 116 may comprise data output devices. The interface(s) 116 may facilitate the communication of the system 106 with various communication and electronic devices, such as the edge device 102.

Further, the system 106 may include engines 118 coupled to the processor 112 and implemented as a combination of hardware and programming, for example, programmable instructions to implement a variety of functionalities of the engines 118. In examples described herein, such combinations of hardware and programming may be implemented in several different ways. For example, the programming for the engines 118 may be executable instructions. Such instructions may be stored on a non-transitory machine-readable storage medium which may be coupled either directly with the system 106 or indirectly (for example, through networked means). In the present examples, the non-transitory machine-readable storage medium may store instructions that, when executed by the processor, implement the engines 118. In other examples, the engines 118 may be implemented as electronic circuitry.

The engines 118, amongst other things, include routines, programs, objects, components, and data structures, which perform particular tasks or implement particular abstract data types. The engines 118 may also be implemented as, signal processor(s), state machine(s), logic circuitries, and/ or any other device or component that manipulates signals based on operational instructions. Further, the engines 118 can be implemented by hardware, by computer-readable instructions executed by a processing unit, or by a combination thereof. The engines 118 may include an anomaly detection engine 120, a classification engine 122, and a command engine 124.

In an example, the anomaly detection engine 120 may obtain sensor data captured by a plurality of sensors 104 installed at the site. The sensor data may relate to data pertaining to a plurality of parameters associated with a battery installed at the site. In some embodiments, the sensor data may comprise data pertaining to a plurality of parameters associated with peripheral components in the network environment 100, such as power lines associated with the batteries. In the present example, the plurality of parameters may include battery charge voltage, battery discharge voltage, currents, a State of Charge (SOC) of the battery, load, time, charge/discharge currents, and temperature. The anomaly detection engine 120 may communicate with the processor 112 to obtain the sensor data.

In an implementation, the processor 112 may obtain the sensor data from the edge device 102. In an example, the sensor data may be obtained from the edge device 102 at pre-defined time intervals. In another example, the processor 112 may obtain the sensor data from the edge device 102 upon occurrence of specific events, such as alarm conditions, delta changes in key performance indicators (KPIs), such as battery voltage. In another implementation, the edge device 102 may obtain the sensor data from the plurality of sensors 104 deployed on the site. In an example, the edge device 102 may obtain the sensor data at pre-defined time intervals. In another example, the edge device 102 may obtain the sensor data upon occurrence of specific events, such as alarm conditions, delta changes in key performance indicators (KPIs), such as battery voltage.

The anomaly detection engine 120 may further obtain historical data pertaining to the battery installed at the site. In an example, the historical data may be obtained from the database 110, since the time of installation of the battery. In another example, the historical data may be obtained from a memory (not shown) of the edge device 102.

Based on the historical data, the anomaly detection engine 120 may perform an analysis of the sensor data obtained from the plurality of sensors 104. In an implementation, the anomaly detection engine 120 may include a first machine learning model that may utilize the historical data and the sensor data to predict any anomalies in the performance of the battery. In an example, the first machine learning model is trained on a plurality of training examples. For instance, a training example may include a plurality of historical parameters, such as battery capacity, associated with the battery since installation. The training example may also include a label that indicates whether or not the battery experienced an anomaly event. The first machine learning model is trained using historical data associated with the site. For example, the historical data comprises charge and discharge pattern, load pattern of the battery, and environmental data.

In an implementation, the anomaly detection engine 120 may employ certain rule-based techniques to detect anomaly events at the site. Examples of the anomaly events may include, but are not limited to, anomaly events comprise battery voltage fluctuations, current pattern variations, and overheating. For example, based on a load pattern at the site and battery capacity or age, the rule-based techniques may determine if the battery at the site is undersized or oversized. Based on the determination, such batteries may be reused optimally at another site thereby improving operational costs. In some embodiments, based on the load pattern of a site and battery capacity for the site, the rule-based techniques determine if there is module shortage at the site which may cause improper battery charging cycles.

In an example, the first machine learning algorithm is an algorithmic drop rate model (ADRM) 126. In some embodiments, the ADRM 126 provides a systematic approach to active physical validation methods. In some embodiments, the ADRM 126 is configured to analyse battery charge and discharge patterns to track battery issues at the site. The ADRM 126 may analyse key indicators, such as battery voltage fluctuation, overheating of battery, and unusual current pattern variations during charging and discharging of the battery installed at the site.

Further, the ADRM 126 may compare behaviour of the key indicators with a site signature to detect any disruption in the performance of the battery. In an example, the site signature may be understood as an ideal behaviour expected from the battery installed at the site. In an example, ADRM 126 may benchmark the behavior of battery KPIs (efficiency, cycle voltages, currents, discharge curve, etc.) using historical data. The ADRM 126 may monitor the behavior of these KPIs on a regular basis keeping into account age-related deterioration of the battery. Based on the monitoring of the battery, the ADRM 126 may generate an ADR score for the battery. For example, a new 600 ah fully charged battery, is expected to give 300 ah energy charge at 50% depth of discharge (DoD). The ADRM 126 may monitor a battery discharge pattern/curve and make any adjustments regarding aging of the battery. Based on the battery discharge pattern/curve, the ADRM 126 determine performance of the battery and provide a score. For example, the ADRM score is generated using a combination of battery KPIs, such as energy charge efficiency, battery voltage behavior, charge/discharge patterns etc.

Figure 2:
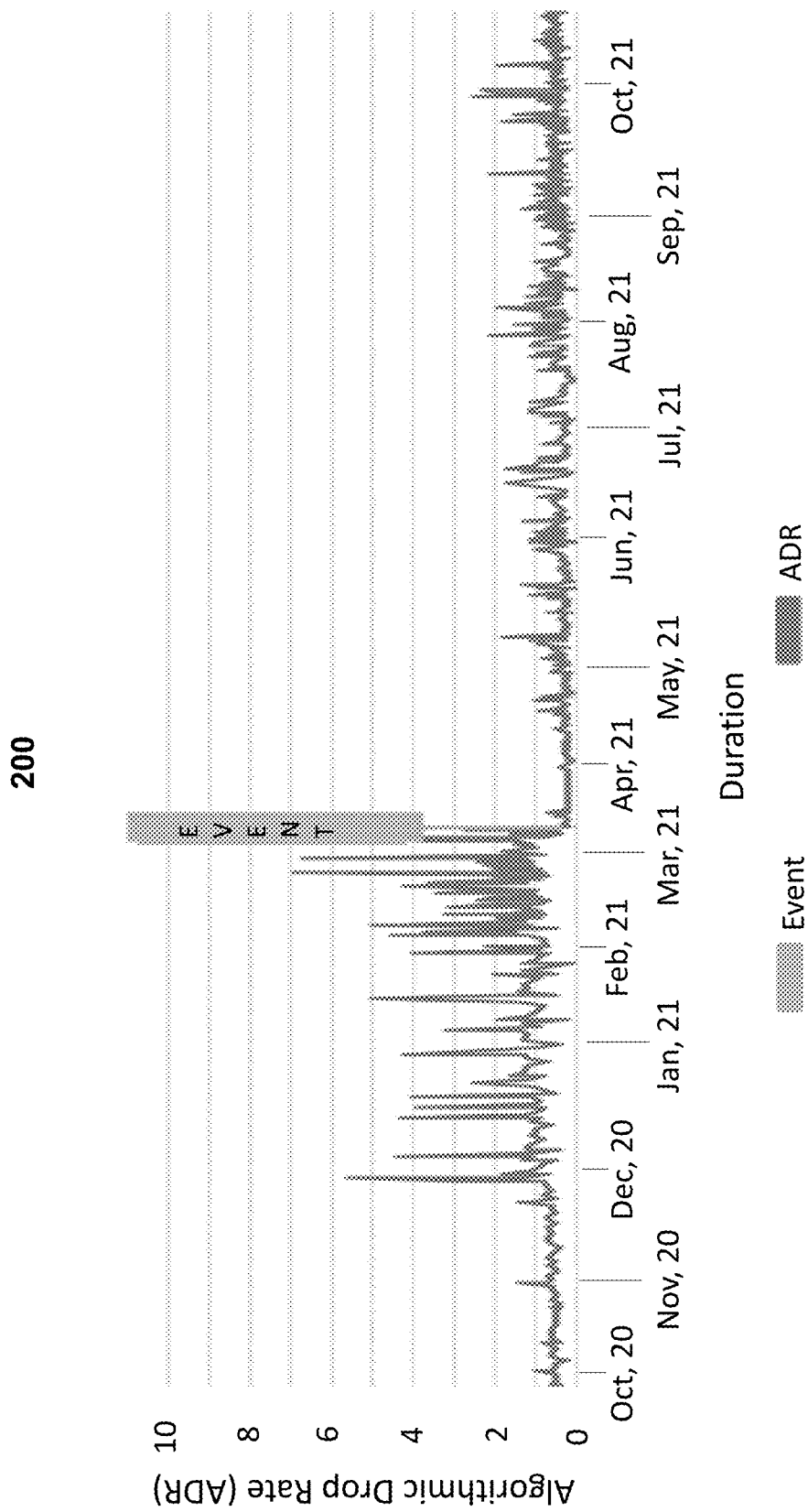
FIG. 2 illustrates an algorithmic drop rate (ADR) pattern indicating battery performance disruption, according to an example.

For example, referring to FIG. 2, an exemplary graph 200 illustrating an algorithmic drop rate (ADR) pattern indicating battery performance disruption, according to an example. The X-axis of the graph 200 indicates a timeline and the Y-axis of the graph 200 indicates the ADR. As can be clearly seen from the graph 200, the ADR ranges between 0 and 7, before $15^{th}$ Mar. '21. After change in the battery, the ADR ranges between 0 and 2, thereby clearly indicating disruption in battery performance. Thus, the ADRM 126 analyses the battery behavior and detects any disruption in the battery behavior before and after a battery change event. Since the ADRM 126 detects the disruption in battery behavior in advance, corrective actions may be taken within time.

Further, the anomaly detection engine 120 may provide the ADRM 126 with all possible faults from the historical data. For example, the ADRM 126 may be trained to detect real time voltage patterns based on the previously trained fault conditions. In some embodiments, when any unusual pattern is detected, the ADRM 126 may further check for the unusual pattern based on a length of a discharge cycle of the battery. For example, shorter or partial discharge cycles of the battery may reflect upon a different behavior of the battery as compared to a full discharge cycle of the battery.

Figure 3:
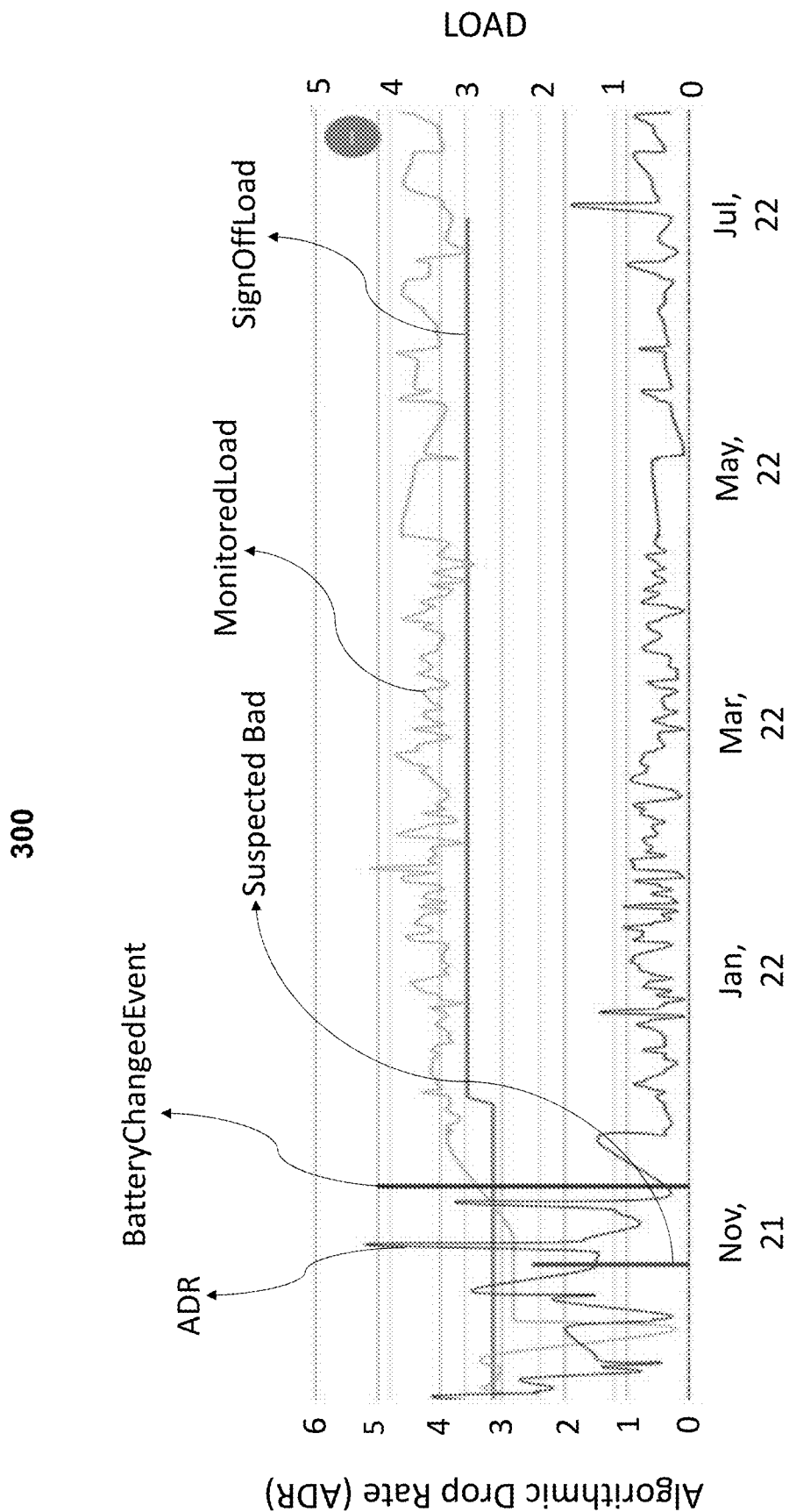
FIG. 3 illustrates a graph depicting an algorithmic drop rate (ADR) with load and battery changes, according to an example.
Figure 4:
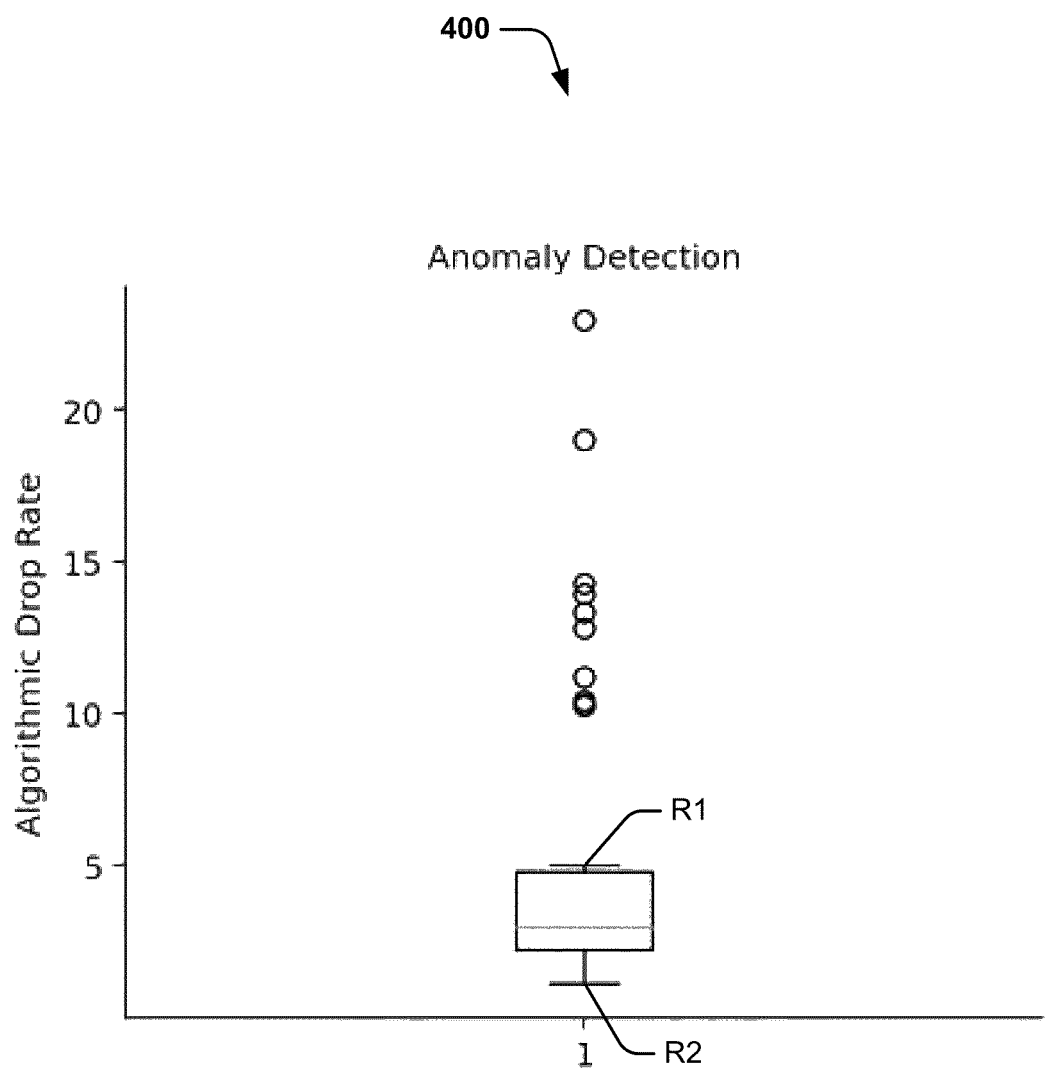
FIG. 4 illustrates a box plot for anomaly detection of a site, according to an example.

For example, referring to FIG. 3, a graph 300 depicting an algorithmic drop rate (ADR) with load and battery changes is illustrated, according to an example. In some embodiments, the ADRM 126 may monitor various parameters related to the battery to assess the condition of the battery, for example, the impact of ageing on the battery behavior. For example, the ADRM 126 may analyze parameters, such as SOC, voltage, current, peak current, load, and so on. The result of analysis of each parameter is stored in the database 110. While analyzing the parameters, the ADRM 126 may consider ageing impact, such as theoretical degradation of the battery based on age and the actual degradation of the battery based on the site conditions to identify any patterns that are not in-line with the ADR.

For example, various types of patterns are identified like battery misuse (e.g., frequent deep discharges without sufficient charging of the battery), overcharging of the battery (e.g., battery discharge cycles not present), overheating of the battery, sudden/steep voltage level drops at same/similar load, decline in energy output/backup hours as compared to the depth of discharge, etc. The identification of such patterns may be indicative of abnormalities. These abnormalities may be further categorized into critical or non-critical events. For the critical events, immediate actions are taken while non-critical events are monitored over a longer period to better understand the root cause of the non-critical events.

In case of critical events preventive actions are performed. For example, in case of sudden battery voltage drop, immediate command is sent out to the RTU to switch to the available source (say Electricity/Diesel Generator (DG) etc). If DG is not installed and electricity is not available, battery backup is improved by sending a command to disconnect non-critical loads at the site. In another example, consistent improper charging of battery even when sufficient external source, such as electricity is available to fully charge the battery, is considered as a critical event. In such cases, a notification is sent out to field force to visit the site for verifying the Rectifier modules (the Rectifier modules may be faulty or insufficiently installed). Such preventive actions may ensure improvement in site uptime and thereby reduction in penalties. The term 'penalty' refers to a financial deduction made by a customer in case the site doesn't meet the uptime guaranteed in the contract. The timely intervention improves life and efficiency of the battery and hence, reduces the operating costs.

The ADRM 126 may use the following equation to determine the variation in the behavior of the battery:

$$Y_t \sim Y_{t-n} + \text{Exogenous variables} + \varepsilon \quad (1)$$

where, $Y_t$ indicates current lag voltage drop,
$Y_{t-n}$ indicates $N^{th}$ lag voltage drop,
Event triggering (Z)=1, when $Y_t$>threshold value, and Z=0, when $Y_t$<threshold value,
$\varepsilon$ indicates an error term, and
Standard deviation=$\sigma(Y_t, Y_{t-1}, \ldots, Y_{t-n})$ Alternatively or additionally, the ADRM 126 may determine ADR outliers that may cause disruption in the performance of the battery. The presence of such ADR outliers indicates anomalous events during transition between sources, noisy data events from hardware, and/or manual testing at the site during physical visits for maintenance. For example, referring to FIG. 4, a box plot 400 for anomaly detection of a site is illustrated, according to an example. The box plot 400 indicates the distribution of ADR (calculated from discharge cycles), for a given site. To determine outliers, the ADRM 126 uses the below criteria:

Q1=$25^{th}$ percentile ADR
Q2=$50^{th}$ percentile ADR or Median ADR
Q3=$75^{th}$ percentile ADR
IQR=Q3−Q1 ADR
Q means quartile and IQR stands for Inter Quartile Range. IQR is indicative of a region where majority of the values lie, in the spread of the data. It gives us the central tendency of the data. Based on the IQR, outliers are determined. For example, anything beyond Q3+1.5 times the IQR value or before Q1−1.5 times the IQR value are considered as outlier values.

In some embodiments, for discharge cycles, whose ADR is greater than (Q3+1.5*IQR) are marked as outliers by the ADRM 126 to avoid such outlier events leading to erroneous conclusions. Accordingly, in the box plot 400, the ADRs that do not fall within the defined range of R1 and R2 may be considered as outliers by the ADRM 126.

Figure 5:
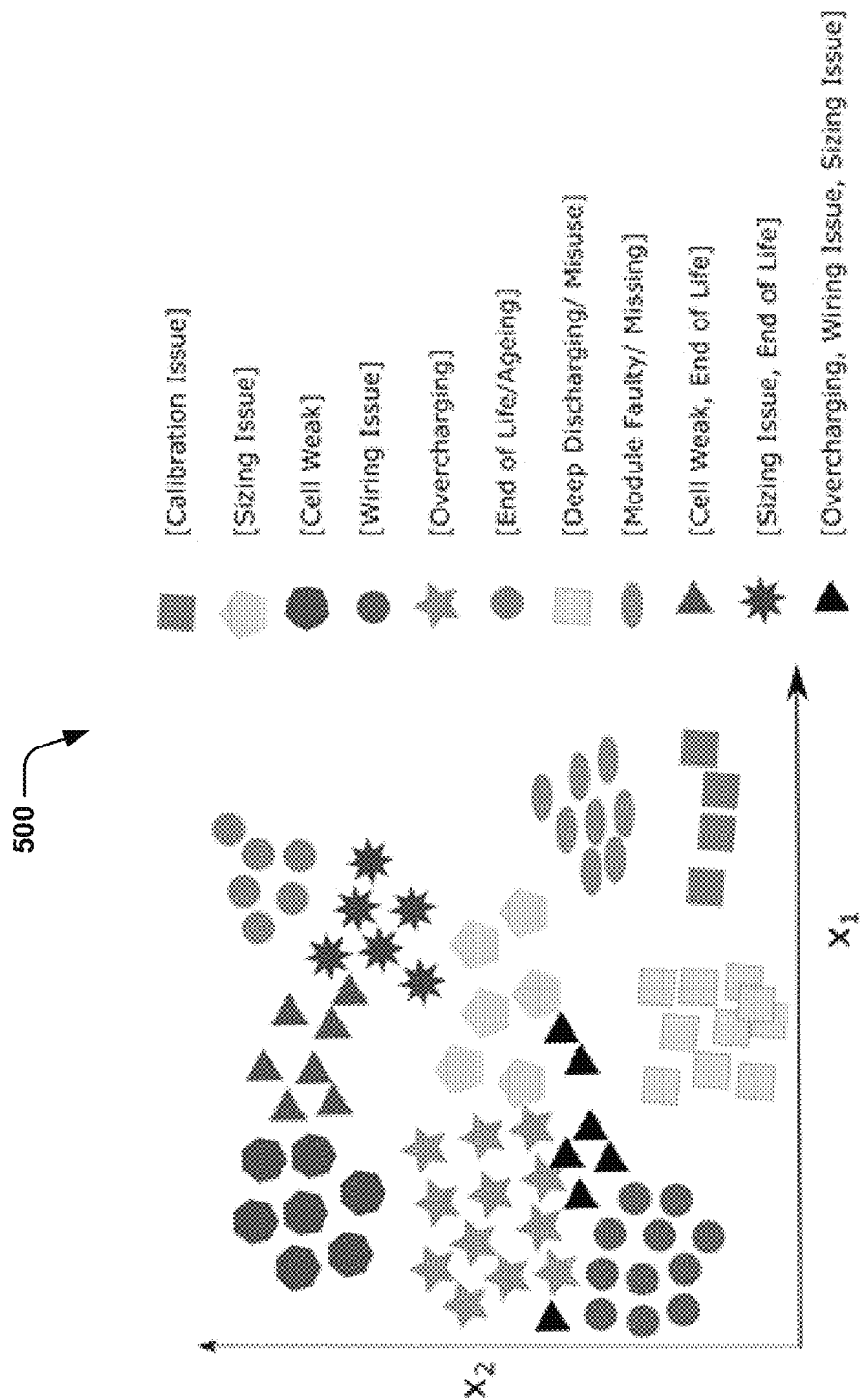
FIG. 5 illustrates a 2-D representation of fault clusters, according to an example.

The processor 112 may generate 2-D representation of various clusters of faults or anomalies that are detected in the data received from a site. Referring to FIG. 5, a 2-D representation 500 of fault clusters is illustrated according to an example. For example, the faults may be due to site voltage, load, ah pattern, current patterns, and so on. The processor 112 may create labels pertaining to different faults and associate the same with the battery. A label may be indicative of a health level of the battery and may provide information about an anomaly event experienced by the battery. In an example, the labels may be created based on sizing issue, calibration issue, wring issue, overcharging, deep discharging, and so on. The labels may be provided as an input to the ADRM 126 for predicting anomalies in the battery behavior.

Referring again to FIG. 1, the classification engine 122 may classify the anomaly events as critical events and non-critical events. For example, the classification engine 122 may classify the anomaly events based on site energy source patterns and site signature related to battery charge and discharge behavior. A source pattern at a site refers to the historical trend or pattern of which source is available or was used at what time of day or season to ensure site uptime. In an example, the site energy uptime is determined by the energy availability at the site. The energy to a site is provided by different energy sources. For example, solar energy is provided to the site during daytime, if available or extra solar energy is generated and stored in a battery during the day, the same could be provided to the site at night through the battery. In some embodiments, when solar energy is not available, the site may be operated by the energy from electricity or Diesel Generators (DGs). In some embodiments, the energy provided to operate the site may follow a priority list, for example, by a sequence of solar energy, electricity energy, DGs, and the site will use the energy source next in the line if a previous one is not available. In some situations, solar energy may be combined or replaced with other renewable sources like wind, fuel cells etc.

Figure 6:
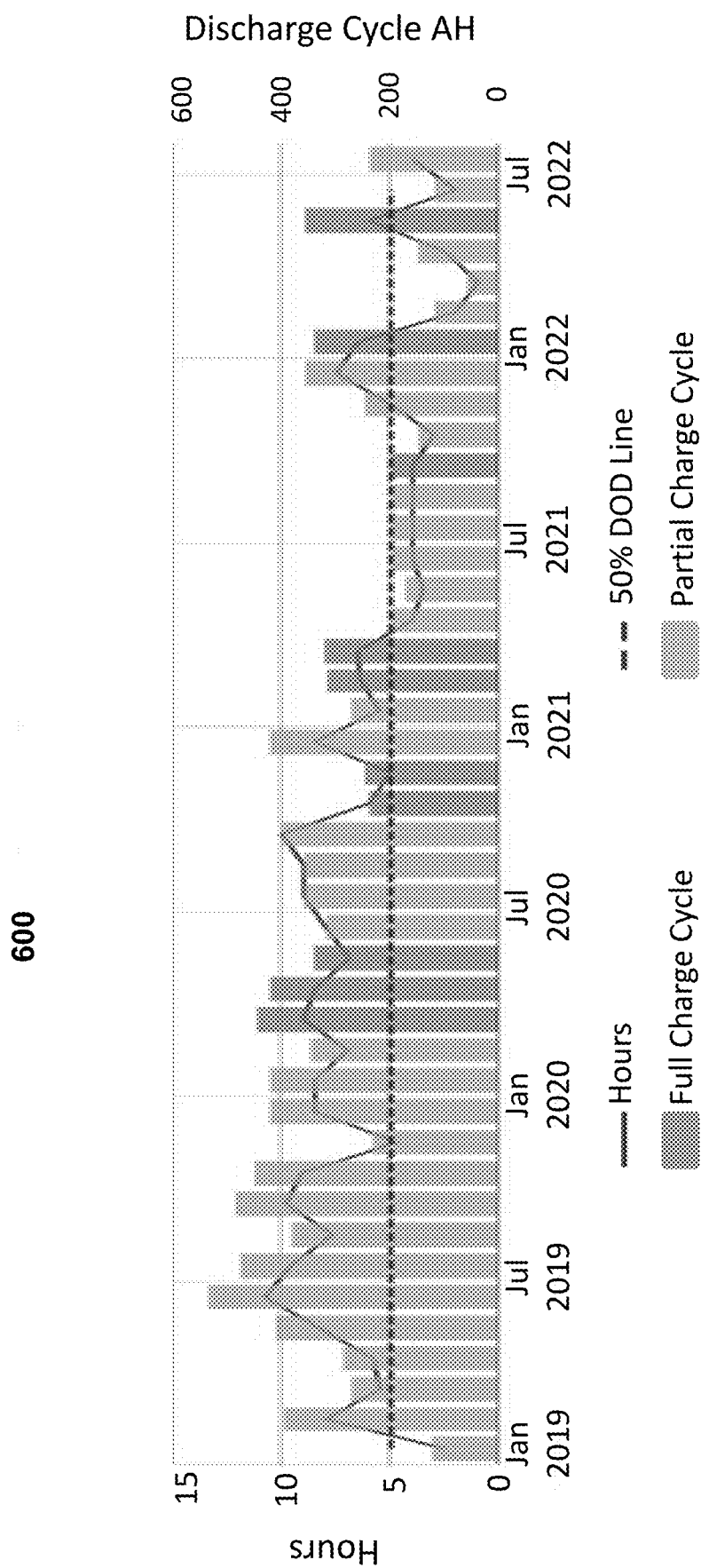
FIG. 6 illustrates a graph depicting battery discharge pattern since battery installation, according to an example.

To classify the anomaly events, the classification engine 122 may analyze the charge and discharge cycles of the battery at the site. In this respect, FIG. 6 depicts a battery discharge pattern 600 since battery installation at the site, according to an example. The battery discharge pattern 600 may be provided as an input to the classification engine 122 along with charge current and voltage available. Based on the input, the classification engine 122 may determine whether the discharge cycle of the battery is short or long.

In an implementation, when the duration of the discharge cycle is not short, the classification engine 122 may employ a second machine learning model 128, such as K-means clustering. K-means clustering is implemented on the battery charge/discharge events based on the type of behavior, such as maximum voltages reached during charging/discharging duration, discharge rate/curve, energy charge/DoD, load pattern, minimum voltages/DoD/duration, battery discharge start/end voltages, temperatures, and so on, to group the anomaly events.

In the present implementation, the critical events and the non-critical events may be pre-defined. In an example, during physical maintenance of the site, anomalous behavior events may be observed from the site's battery. Such behavior is not considered critical as the site is being physically tested by technicians. In another example, in case a rectifier module is faulty or power plant settings are incorrect, the battery at the site may not charge properly. This may result in low ADR score of the battery. Such scenarios are defined as critical events.

Upon identification of a critical event, the classification engine 122 may decompose the critical event to determine a root cause of occurrence of the critical event. The classification engine 122 may use the below equation to determine whether or not an anomaly event is critical.

$$Y \sim f(\text{load, current, cycle end voltage, previous charge cycle start voltage, } ah \text{ consumed, battery capacity}) \quad (2)$$

where, Y=[calibration, battery issue, overcharging undercharging, ageing]

Once the critical events are identified, the root cause behind the critical event is identified. For example, the classification engine 122 may generate a variable, battery capacity. The variable is derived from best discharge cycle when the battery is fully charged and then the battery is discharged to a certain depth (x % DoD).

$$\text{Battery capacity}(ah) = \text{Discharge current}(A) * \text{Time to discharge(hours)} \quad (3)$$

For example, the K-means clustering model 126 may perform a squared error function for clustering events. For example, for clustering events based on voltage drop and site-specific parameters, the K-means clustering model 126 may perform the squared error function as:

$$\text{Issue tagging for each sites} = \Sigma_{j=1}^{k} \Sigma_{i=1}^{n} \|x^{ji} - C_j\|^2 \quad (4)$$

where, $\Sigma_{j=1}$ indicates number of clusters, i.e., battery fault type,
$\Sigma_{i=1}^{k}$ indicates number of cases, i.e., ADR,
$C_j$ indicates centroid for cluster, and
$\|x^{ji} - C_j\|$ indicates a distance function.

In another implementation, the duration of the discharge cycle may not be known, or the duration of the discharge cycle is short. In such cases, the classification engine 122 may be unable to classify the anomaly events into critical or non-critical events. For example, a short discharge cycle may be understood as a battery discharge cycle of small duration. In an example, if a site is getting power from grid, but the grid is not available for small period of about 10-15 minutes. In such case, the site will immediately start drawing power from stored energy in battery bank installed at the site. This may cause the battery bank to discharge in a short period of time. Short discharge cycles may be unable to provide sufficient details about performance of the battery based on which predictions may not be made.

Upon detection of a critical event, a short discharge cycle of the battery, or non-availability of discharge cycle of the battery, the classification engine 122 may communicate with the command engine 124 to issue commands to the edge device 102. For example, the command engine 124 may automatically issue one or more commands to the edge device 102 when the classification engine 122 is unable to classify the anomaly events. For example, in case of short duration battery discharge cycles, sufficient details are unavailable, or the findings are skewed about the performance of the battery so the predictions cannot be made correctly. In such a scenario, the command engine 124 may send a command to the edge device so that the site load is taken off the source (Electricity/DG etc) and put on battery when battery is fully charged, without impacting other operations at the site. This ensures that there is one or more full battery discharge cycles (50% DOD) data available for the models to learn battery behaviour. In another example, if battery data is not coming correctly (spurious battery voltage, no charge discharge currents), the command engine 124 may send a notification to the field force to visit the site and take corrective actions, such as replace faulty sensor, ensure proper connection, correct calibration issues. Corrective action taken by the field force on the site ensures quality of battery data received by the model and hence proper analysis going forward. In response to the one or more commands, the edge device 102 may perform actions on the battery. In an example, the one or more commands may include charging the battery and forcing a discharge of the battery.

In an example, when the discharge is not available for last 'n' days or duration of the discharge cycle is less than a pre-defined time, for a particular site, a command is sent by the command engine 124 to the edge device 102. The command may include instructions to create a discharge cycle based on availability of the grid, solar, and diesel generator. In response to the command, the edge device 102 may ensures that, when battery is fully charged, the site load is handled through the battery even if some energy source (such as grid/diesel generator) is available.

In an implementation, the classification engine 122 may determine a reason for absence of an optimum discharge cycle of the battery. In an example, if the short discharge cycle is due to undercharging of the battery, the classification engine 122 may send a command to the edge device 102 to boost charge the battery. In another example, the short discharge cycle may be due to improper discharging of the battery. In absence of proper discharging, overcharging the battery may result is deterioration. Thus, the command engine 124 may send a command to the edge device to force a proper discharge cycle for upto 50% DoD of the battery.

For sites, where battery management system (BMS) is installed, the field validation of the ADRM 126 was performed. For these sites, after field validation, the precision of the ADRM 126 was observed to be 97.5%, as depicted in Table 1 below.

TABLE 1

| Predicted by ADRM | True Positives | False Positives | Precision (%) |
| --- | --- | --- | --- |
| 160 | 156 | 4 | 97.5 |

The BMS provides additional input parameters to the ADRM 126, such as cell voltage, temperature, and so on.

For sites, where BMS is not installed, precision of the ADRM 126, after field validation, was 91.67% as depicted in Table 2 below.

TABLE 2

| Predicted as Faulty | True Positives | False Positives | Precision (%) |
|---|---|---|---|
| 12 | 11 | 1 | 91.67 |

In some embodiments, the edge device 102 is provided with the capability of taking certain actions independently. For example, in situations when the edge device 102 is unable to communicate with the system 106, the edge device 102 may be trained to perform specific actions upon occurrence of a critical event, without waiting for instructions from the system 106. For example, based on the analysis of plurality of parameters associated with the battery, the ADRM 126 may share results of the analysis with the edge device 102. The edge device 102 may perform actions based on the results of the analysis received from the ADRM 126. These actions may include charging the battery and forcing a discharge of the battery based on the results received from the ADRM 126.

In some embodiments, based on the results, the edge device 102 may, upon occurrence of critical events and non-availability of the system 106, may take certain pre-defined actions. In an example, the edge device 102 may compute a threshold value where battery discharge cycle should be stopped, if source is available, to ensure that the site does not go down. In another example, based on a grid pattern of the site, the edge device 102 may set thresholds for charging the battery to ensure the battery doesn't deteriorate due to overcharging.

Accordingly, the present subject matter ensures that battery life is maximized automatically using machine learning models, without any manual intervention. Timely fault detections in the battery may ensure that battery issues are corrected in time, thereby enhancing the efficiency of the site.

Figure 7:
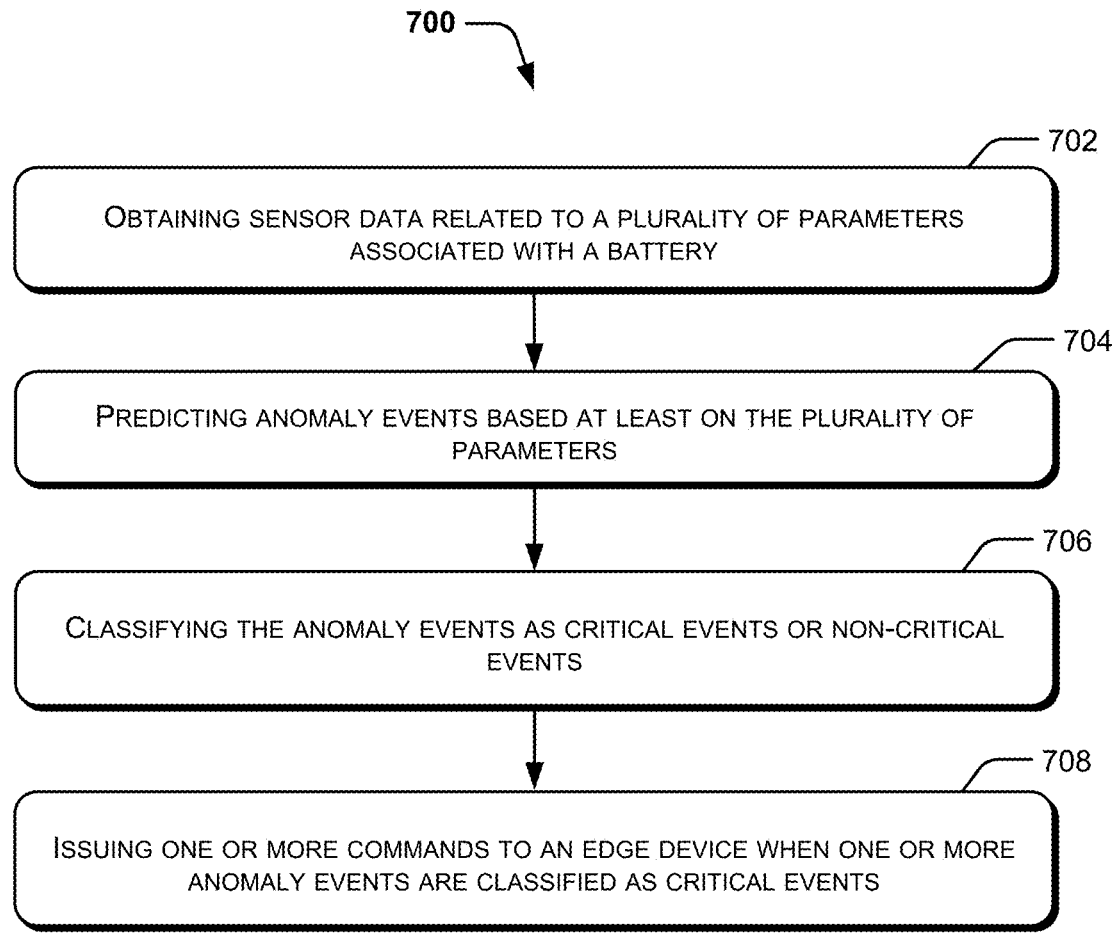
FIG. 7 illustrates a method for monitoring and optimizing battery performance for a site, according to an example.
Figure 8:
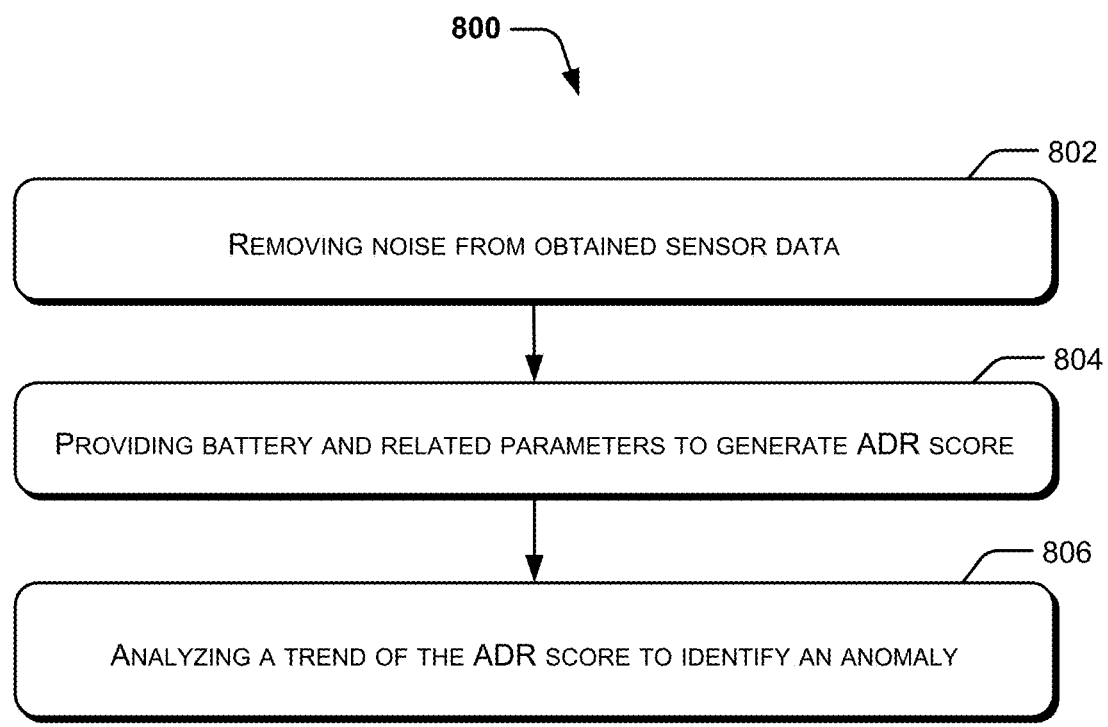
FIG. 8 illustrates a method for predicting anomalies by a first machine learning model, according to an example.
Figure 9:
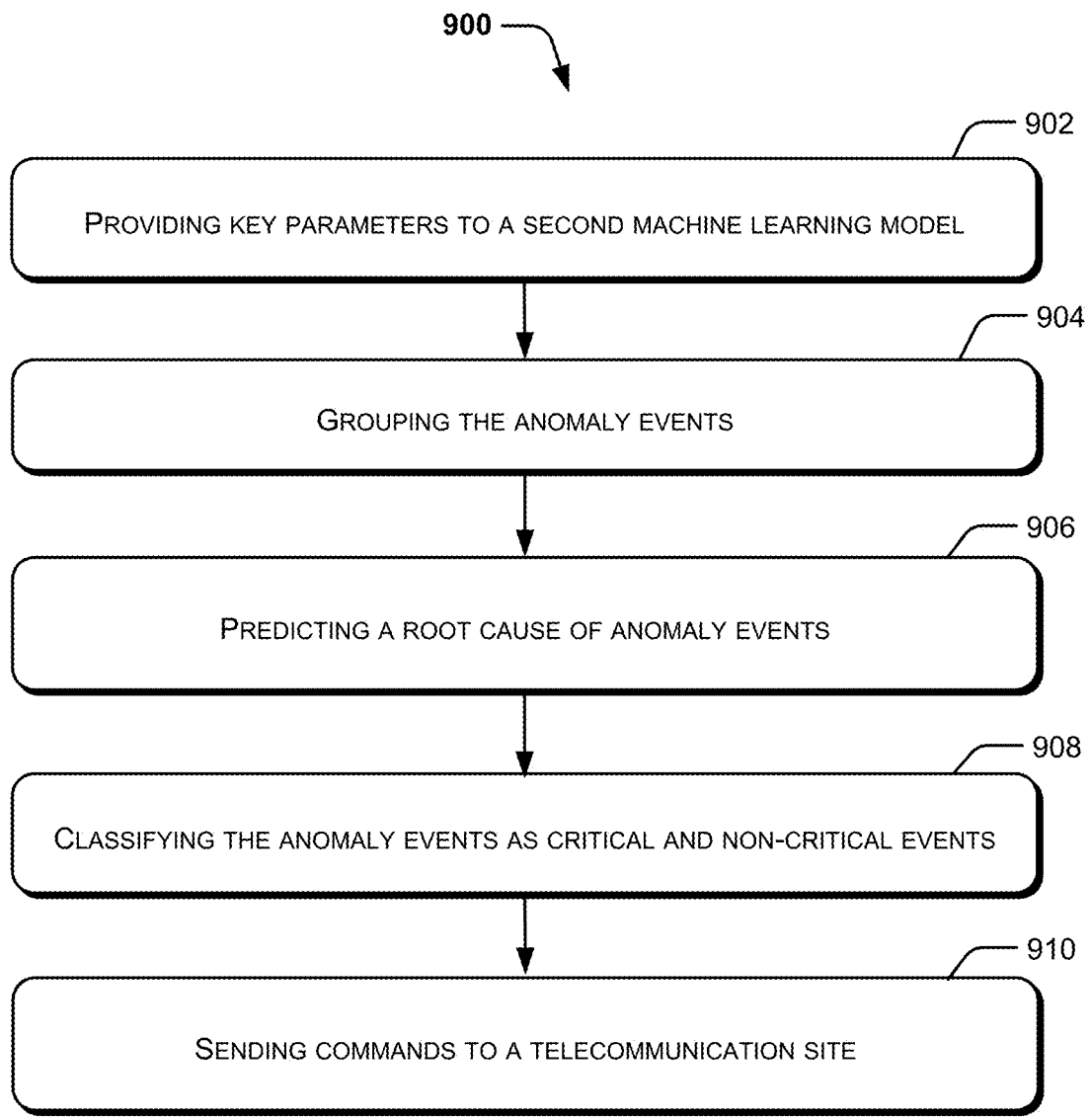
FIG. 9 illustrates a method for classifying the anomalies by a second machine learning model, according to an example.

FIG. 7 illustrates a method 700 for monitoring and optimizing battery performance for a site, according to an example. Examples of the site may include, but are not limited to, a telecommunications site, a banking site, and a power grid site. FIG. 8 illustrates a method 800 for predicting anomalies by a first machine learning model, according to an example. FIG. 9 illustrates a method 900 for classifying anomalies by a second machine learning model, according to an example. The methods 700, 800, 900 can be implemented by processor(s) or device(s) through any suitable hardware, a non-transitory machine readable medium, or a combination thereof. Further, although the methods 700, 800, 900 is described in context of the edge device 102 and the system 106, other suitable devices or systems may be used for execution of the methods 700, 800, 900.

In some examples, processes involved in the methods 700, 800, 900 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Referring to FIG. 7, in an example implementation, at block 702, the method 700 may include obtaining sensor data related to a plurality of parameters associated with a battery. The plurality of parameters associated with the battery may include, but are not limited to, battery charge voltage, battery discharge voltage, currents, State of Charge (SOC) of the battery, load, and temperature.

In an implementation, the processor 112 may obtain the sensor data from the edge device 102. In some embodiments, the processor 112 may obtain sensor data directly from sensors 104 and bypass the edge device 102. In an example, the sensor data may be obtained from the edge device 102 at pre-defined time intervals or continuously. In another example, the processor 112 may obtain the sensor data from the edge device 102 upon occurrence of specific events, such as alarm conditions, delta changes in key performance indicators (KPIs), such as battery voltage. In another implementation, the edge device 102 may obtain the sensor data from the plurality of sensors 104 deployed on the site. In an example, the edge device 102 may obtain the sensor data at pre-defined time intervals. In another example, the edge device 102 may obtain the sensor data upon occurrence of specific events, such as alarm conditions, delta changes in key performance indicators (KPIs), such as battery voltage.

At block 704, the method 700 may include predicting anomaly events based at least on the plurality of parameters. In an example implementation, the anomaly detection engine 120 may detect the anomaly events based on the plurality of parameters. In an example, the anomaly events may be predicted with the help of a first machine learning model, such as an Algorithmic Drop Rate Model (ADRM) 126, and/or rule-based techniques. For example, based on a load pattern at the site and battery capacity or age, the rule-based techniques may determine if the battery at the site is undersized or oversized. Based on the determination, such batteries may be reused optimally at another site thereby improving operational costs. In other cases, based on the load pattern of a site and battery capacity for the site, the rule-based techniques determine if there is module shortage at the site which may cause improper battery charging cycles.

As depicted in FIG. 8, at block 802 the method 800 may include removing noise from the obtained sensor data. In an example, to predict the anomaly events, the anomaly detection engine 120 may clean the sensor data of any wrong feeds, such as feeds collected while an energy source is in transition from one mode to another, erroneous feeds that may have come temporarily due to electronic noise, and the like.

Further, in some cases, feeds may be missed between the edge device and the server and data is not received at the server due to various reasons, such as errors in sensors, network issues, communication corruption, and so on. In such cases, the anomaly detection engine may perform imputation of data for the missing feeds using historical and current trends (start/end voltages, currents, energy source pattern, etc.) for maintaining the continuity of feeds.

Further, at block 804, the method 800 may include providing battery related parameters, such as battery voltage, charge/discharge currents, source voltages, source currents, temperatures, state of charge (SOC), into the ADRM 126. Based on the battery related parameters, the ADRM 126 may generate the ADR score.

At block 806, the method 800 may include analysing a trend of the generated ADR score to identify the anomaly. In an example, the anomaly detection engine 120 may analyse any significant deviations from the normal distribution of ADR. Such deviations may indicate the occurrence of an anomaly event. For a battery having an ADR beyond a fixed threshold of Q3+1.5 timed the IQR value, the anomaly detection engine 120 may indicate that the battery health is abnormal. In some embodiments, the fixed threshold may be set at different values relative to the examples provided. In some embodiments, the threshold may be flexible threshold based on circumstances. In some embodiments, the threshold may be automatically generated based on the circumstances, such as based on the types of anomaly events being detected and/or predicted.

Referring again to FIG. 7, at block 706, the method 700 may include classifying the anomaly events as critical events or non-critical events. In an implementation, the classification engine 122 may classify the anomaly events as critical or non-critical based on a duration of the discharge cycle of the battery. In an example, the classification engine 122 employs a second machine learning model 128, such as K-means clustering.

As depicted in FIG. 9, at block 902 the method 900 may include, for each anomaly event detected by the ADRM 126, providing key parameters to the second machine learning model. For example, the classification engine 122 may input parameters, such as charge and discharge current of battery, voltage levels, distribution of ADR score, SOC, peak current, and load, to the second machine learning model (e.g., a K-means clustering model).

Further, at block 904, the method 900 may include grouping the anomaly events. In an example, the K-means clustering model may be used to group the anomaly events to identify if the event is of same type or different type as one site may have multiple types of anomalies that may be identified by the sensor data. In an example, the grouping of the events is based on battery discharge start/end voltages, temperature, start end charge/discharge currents, ADR score etc.

At block 906, the method 900 may include predicting a root cause of the anomaly event. In an example, the classification engine 122 may employ techniques to predict the root cause of the anomaly based on plurality of parameters. For example, based on actual physical verification of the detected anomaly events, the second machine learning model is further trained to map an anomaly event with a probable root cause. For example, sudden drops in battery discharge voltage patterns may be related with weak cells. In another example, if battery doesn't reach floating voltage, even if the battery has been charged for sufficiently long period of time, second machine learning model may map such a pattern to faulty power plant settings. Examples of the root causes may include, but are not limited to, weak cells, module faulty, improper charging, battery misuse and high temperature, etc.

At block 908, the method 900 may include classifying the anomaly events as critical and non-critical events, based on the predicted root cause. In an example, the classification engine 122 may classify the anomaly events as critical and non-critical events. Examples of the critical events may include, but are not limited to, steep/sudden battery voltage drop, incorrect wiring, load change event, calibration issue, sensor faulty or missing, overheating/overcharging, capacity degradation, battery misuse (frequent deep discharges), battery undercharging (incorrect parameter settings in the power plant, module faulty/missing etc.), and weak cells.

Some examples of noncritical events are as follows: Incorrect/Missing values like current/voltages etc due to maintenance activity at the site Some events are noncritical like capacity degradation if it is age related or battery undercharging if it is temporary in nature.

At block 910, the method 900 may include sending commands to the site for at least one of taking preventive actions in case of critical events and sending notifications to the field force to take corrective action at the site. In an example, the classification engine 122 may send the critical events to the command engine 124 to take corrective actions or to generate notifications to the field force.

Referring again to FIG. 7, at block 708, the method 700 may include issuing one or more commands to an edge device 102 when one or more anomaly events are classified as critical events. In an implementation, the command engine 124 may issue commands to the edge device 102 to take corrective actions. For example, when the discharge cycle is not available for last 'n' days for a particular site, a command is sent by the command engine 124 to create a discharge cycle based on availability of the grid, solar, and diesel generator. In some embodiments, as described herein elsewhere, the edge device 102 may take actions without the aid of the command engine 124.

In an embodiment, the command engine 124 may send commands to the edge device to maintain the site effectively. The command engine 124 may also send notifications to the field force for maintaining the site. Some examples of the corrective actions, based on the commands issued by the command engine 124, taken for maintaining battery health may include, but are not limited to, auto-switchover to source (Electricity/DG) when battery backup is about to get over (50% DOD) or depending on the requirement of equipment installed at a site, for example, BTS installed at the telecommunication site, modify power plant settings for optimal charging of battery, creating discharge cycles for battery performance monitoring, boost charging the battery to ensure battery health, controlling rate of charging (In case EB not available for a longer period, then quickly charge the battery to avoid dependency on diesel generators), and maintaining temperature of power plant to avoid overheating.

Some examples of notifications issued to the field force may include, but are not limited to, cell weak (need replacement), rectifier module faulty or missing, oversized battery based on load requirement of the site, under sized battery based on load requirement of the site, improper wiring, calibration issue, sensor missing, and senor faulty.

The present subject matter is intended to monitor battery performance on a site (such as a telecommunication site, a power grid site, a commercial site, etc.) and in particular to take preventive and predictive corrective steps to enhance and optimize the battery performance and life of the battery. Examples of the intended use cases of the present subject matter include, but are not limited to, preventive monitoring and timely escalation to optimize battery performance and improve battery life, enhancing battery backup and auto switchover to ensure site uptime, optimal battery sizing.

Although aspects for the present disclosure have been described in a language specific to structural features and/or methods, it is to be understood that the appended claims are not limited to the specific features or methods described herein. Rather, the specific features and methods are disclosed as examples of the present disclosure.

We claim:

1. A system (106) for monitoring and optimizing battery performance for a site, the system (106) comprising:
one or more processors (112) configured to:
obtain sensor data captured by a plurality of sensors (104), the sensor data is related to a plurality of parameters associated with a battery;
an anomaly detection engine (120), communicatively coupled to the one or more processors (112), to predict, with aid of a first machine learning model (126), anomaly events based at least on the plurality of parameters from the plurality of sensors (104), wherein the first machine learning model (126) has been trained on a plurality of training examples, wherein a training example of the plurality of training examples comprises (i) a plurality of historical parameters associated with the battery since installation, wherein the plurality of historical parameters comprises battery capacity, and (ii) a label that indicates whether the battery experienced an anomaly event, wherein the anomaly events comprise battery voltage fluctuations, current pattern variations, and overheating;

a classification engine (122), communicatively coupled to the one or more processors (112), to classify the anomaly events as critical events or non-critical events, wherein the classification engine (122) comprises a second machine learning model (128) trained based on battery behavior and site patterns; and a command engine (124), communicatively coupled to the one or more processors (112), to automatically issue one or more commands directing an edge device (102) to take corrective actions on the battery based on the classified critical events, wherein the edge device (102) is coupled with the battery and configured to perform the one or more commands.

2. The system (106) as claimed in claim 1, wherein the plurality of parameters associated with the battery comprises battery charge voltage, battery discharge voltage, currents, State of Charge (SOC), load, and temperature.

3. The system (106) as claimed in claim 1, wherein the first machine learning model (126) is trained using historical data associated with the site, wherein the historical data comprises charge and discharge pattern, load pattern of the battery, and environmental data.

4. The system (106) as claimed in claim 1, wherein the second machine learning model comprises K-Means cluster.

5. The system (106) as claimed in claim 1, wherein the one or more commands comprise charging the battery and forcing a discharge of the battery.

6. A method for monitoring and optimizing battery performance for a site, the method comprising:

obtaining, by one or more processors (112) from a plurality of sensors (104), sensor data related to a plurality of parameters associated with a battery;

predicting, by an anomaly detection engine (120), with aid of a combination of a first machine learning model (126) and rule-based techniques, anomaly events based at least on the plurality of parameters from the plurality of sensors (104), wherein the first machine learning model (126) has been trained on a plurality of training examples, wherein a training example of the plurality of training example comprises (i) a plurality of historical parameters associated with the battery since installation, wherein the plurality of historical parameters comprises battery capacity, and (ii) a label that indicates whether the battery experienced an anomaly event, wherein the anomaly events comprise battery voltage fluctuations, current pattern variations, and overheating;

classifying, by a classification engine (122), the anomaly events as critical events or non-critical events, wherein the classification engine (122) comprises a second machine learning model (128) trained based on battery behavior and site patterns; and issuing, by a command engine (124), one or more commands directing an edge device (102) to take corrective actions on the battery based on the classified critical events, wherein the edge device (102) is coupled with the battery and configured to perform the one or more commands.

7. The method as claimed in claim 6, wherein the plurality of parameters associated with the battery comprises battery charge voltage, battery discharge voltage, currents, State of Charge (SOC), load, and temperature.

8. The method as claimed in claim 6, wherein the first machine learning model (126) is trained using historical data associated with the site, wherein the historical data comprises charge and discharge pattern, load pattern of the battery, and environmental data.

9. The method as claimed in claim 6, wherein the second machine learning model (128) comprises K-Means cluster.

10. The method as claimed in claim 6, wherein the one or more commands comprise charging the battery and forcing a discharge of the battery.

* * * * *